United States Patent
Park et al.

(10) Patent No.: US 10,645,739 B2
(45) Date of Patent: *May 5, 2020

(54) METHOD FOR TIME SYNCHRONIZATION OF DOMAIN BASED ON TIME INFORMATION OF VEHICLE

(71) Applicants: Hyundai Motor Company, Seoul (KR); Kia Motors Corporation, Seoul (KR); Industry-University Cooperation Foundation Hanyang University, Seoul (KR)

(72) Inventors: Seong Jin Park, Gyeonggi-do (KR); Woo Sub Kim, Gyeonggi-do (KR); Ju Ho Lee, Seoul (KR); SungKwon Park, Seoul (KR)

(73) Assignees: Hyundai Motor Company, Seoul (KR); Kia Motors Corporation, Seoul (KR); Industry-University Cooperation Foundation Hanyang University, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/298,555

(22) Filed: Mar. 11, 2019

(65) Prior Publication Data
US 2019/0208558 A1 Jul. 4, 2019

Related U.S. Application Data

(63) Continuation of application No. 15/442,005, filed on Feb. 24, 2017, now Pat. No. 10,264,614.

(30) Foreign Application Priority Data

Feb. 26, 2016 (KR) .................. 10-2016-0023721

(51) Int. Cl.
*H04L 12/801* (2013.01)
*H04L 12/751* (2013.01)
(Continued)

(52) U.S. Cl.
CPC ............ *H04W 76/14* (2018.02); *H04L 67/12* (2013.01); *H04L 67/325* (2013.01); *H04W 4/46* (2018.02);
(Continued)

(58) Field of Classification Search
CPC ..... H04W 76/14; H04W 4/46; H04W 56/001; H04W 72/1205; H04L 67/325; H04L 67/12
See application file for complete search history.

(56) References Cited

U.S. PATENT DOCUMENTS 10,264,614 B2 * 4/2019 Park ................. H04L 67/12
2008/0095134 A1 * 4/2008 Chen ................. H04B 7/2606
370/342

(Continued)

*Primary Examiner* — Faruk Hamza
*Assistant Examiner* — Abusayeed M Haque
(74) *Attorney, Agent, or Firm* — Mintz Levin Cohn Ferris Glovsky and Popeo, P.C.; Peter F. Corless

(57) ABSTRACT

Disclosed are time synchronization methods for domains based on time information of a vehicle. A time synchronization method performed by a first end node belonging to a first domain of a vehicle includes: receiving a first frame including time information from the vehicle; changing the first end node to a grand master node of the first domain when the time information indicates a time of a universal time domain; and synchronizing a time of the grand master node with the time of the universal time domain.

19 Claims, 11 Drawing Sheets

(51) Int. Cl.
   *H04L 29/06* (2006.01)
   *H04W 76/14* (2018.01)
   *H04L 29/08* (2006.01)
   *H04W 56/00* (2009.01)
   *H04W 4/46* (2018.01)
   *H04W 72/12* (2009.01)

(52) U.S. Cl.
   CPC ....... *H04W 56/00* (2013.01); *H04W 72/1205* (2013.01)

(56) References Cited

U.S. PATENT DOCUMENTS

| | | | | |
|---|---|---|---|---|
| 2008/0156406 A1* | 7/2008 | Breed | ................... | B60C 23/041 |
| | | | | 152/415 |
| 2012/0046897 A1* | 2/2012 | Panko | ................. | G01R 13/029 |
| | | | | 702/67 |
| 2013/0054784 A1* | 2/2013 | Yadav | ..................... | H04L 43/18 |
| | | | | 709/224 |
| 2013/0342333 A1* | 12/2013 | Hutchings | ................ | H04N 7/18 |
| | | | | 340/435 |
| 2014/0046882 A1* | 2/2014 | Wood | ....................... | G06N 3/02 |
| | | | | 706/16 |
| 2014/0180539 A1* | 6/2014 | Kim | ....................... | H04W 4/38 |
| | | | | 701/36 |
| 2014/0293828 A1* | 10/2014 | Lee | ....................... | H04J 3/0652 |
| | | | | 370/254 |
| 2015/0194363 A1* | 7/2015 | Jun | ....................... | H01L 23/367 |
| | | | | 257/714 |
| 2016/0135120 A1* | 5/2016 | Sirotkin | ................ | H04W 48/18 |
| | | | | 370/329 |
| 2016/0173352 A1* | 6/2016 | Danielsson | .......... | H04L 43/0864 |
| | | | | 370/252 |
| 2016/0295589 A1* | 10/2016 | Nikopour | .............. | H04W 4/023 |
| 2017/0123429 A1* | 5/2017 | Levinson | .............. | G05D 1/0088 |
| 2018/0145821 A1* | 5/2018 | Pietilainen | ............ | H04J 3/0641 |

\* cited by examiner

METHOD FOR TIME SYNCHRONIZATION OF DOMAIN BASED ON TIME INFORMATION OF VEHICLE

CROSS-REFERENCE TO RELATED APPLICATION

This application is a Continuation of U.S. application Ser. No. 15/442,005 filed on Feb. 24, 2017, which claims the benefit of and priority to Korean Patent Application No. 10-2016-0023721, field on Feb. 26, 2016 in the Korean Intellectual Property Office (KIPO), the entirety of which is incorporated by reference as if fully set forth herein.

BACKGROUND

1. Technical Field

The present disclosure relates generally to methods for time synchronization of domains, and more specifically, to methods for time synchronization of independent domains based on time information of vehicle.

2. Description of the Related Art

The number and variety of electronic devices installed within vehicles have increased significantly along with the rapid digitalization of vehicle parts. Electronic devices may currently be used throughout the vehicle, such as in a power train control system (including, e.g., an engine control system, an automatic transmission control system, or the like), a body control system (including, e.g., a body electronic equipment control system, a convenience apparatus control system, a lamp control system, or the like), a chassis control system (including, e.g., a steering apparatus control system, a brake control system, a suspension control system, or the like), a vehicle network (including, e.g., a controller area network (CAN), a FlexRay-based network, a media oriented system transport (MOST)-based network, or the like), a multimedia system (including, e.g., a navigation apparatus system, a telematics system, an infotainment system, or the like), and so forth.

The electronic devices comprising each of the above systems are connected via the vehicle network, which supports functions of the electronic devices. For instance, the CAN may support a transmission rate of up to 1 Mbps and may support automatic retransmission of colliding messages, error detection based on a cycle redundancy interface (CRC), or the like. The FlexRay-based network may support a transmission rate of up to 10 Mbps and may support simultaneous transmission of data through two channels, synchronous data transmission, or the like. The MOST-based network is a communication network for high-quality multimedia, which may support a transmission rate of up to 150 Mbps.

The telematics system, the infotainment system, as well as enhanced safety systems of the vehicle, require higher transmission rates and system expandability. However, the CAN, FlexRay-based network, and the like may not sufficiently support such requirements. The MOST-based network, in particular, may support a higher transmission rate than the CAN and the FlexRay-based networks. However, costs associated with applying the MOST-based network in all vehicle networks can be expensive. Due to these limitations, an Ethernet-based network is often adopted as a vehicle network. The Ethernet-based network may support bi-directional communication through one pair of windings and may support a transmission rate of up to 10 Gbps.

Meanwhile, domains supporting a generalized precision time protocol (gPTP) in an industrial system may be classified into universal time domains and working clock domains. The working clock domains may be synchronized with the universal time domain. However, in a case where the working clock domain exists independently without any physical connection with the universal time domain, the working clock domain cannot be synchronized with the universal time domain.

SUMMARY

The present disclosure provides methods for time synchronization of an independent domain using time information of a vehicle.

In accordance with embodiments of the present disclosure, a time synchronization method performed by a first end node belonging to a first domain of a vehicle includes: receiving a first frame including time information from the vehicle; changing the first end node to a new grand master node of the first domain when the time information indicates a time of a universal time domain; and synchronizing a time of the new grand master node with the time of the universal time domain.

The first frame may further include information indicating a type of a domain operating based on the time of the universal time domain indicated by the time information.

Communications between the first end node and the vehicle may be performed based on wireless access in vehicular environment (WAVE).

The first end node may be changed to the new grand master node of the first domain when a policy of the first domain allows change of a grand master node.

The first end node may be changed to the new grand master node of the first domain when the first end node supports grand master node functions.

The first domain is a working clock domain.

The method may further comprise measuring a link delay time between the first end node and the vehicle, and the time of the new grand master node may be configured to be a sum of the time of the universal time domain and the link delay time.

The method may further comprise transmitting a second frame including the time information to a previous grand master node of the first domain when the first end node is not changed to a new grand master node of the first domain.

The method may further comprise transmitting a third frame including time information indicating the time of the new grand master node to other communication nodes belonging to the first domain.

The third frame may further include priority information indicating a priority of the new grand master node.

Further, in accordance with embodiments of the present disclosure, a time synchronization method performed by a first end node belonging to a first domain of the vehicle includes: receiving a plurality of frames from a plurality of grand master nodes belonging to the first domain; selecting a frame received from a grand master node having a highest priority among the plurality of grand master nodes based on priority information included in the respective plurality of frames, the selected frame including time information; and synchronizing a time of the first end node with a time indicated by the time information.

Each of the plurality of grand master nodes may have a different priority.

The time information may indicate a time of a universal time domain.

The first domain is a working clock domain.

Further, in accordance with embodiments of the present disclosure, a time synchronization method performed by a first grand master node belonging to a first domain of a vehicle includes: receiving a frame from a second grand master node belonging to the first domain, the frame including priority information and time information; comparing a priority of the first grand master node with a priority of the second grand master node which is indicated by the priority information; and changing the first grand master node to an end node when the priority of the first grand master node is lower than the priority of the second grand master node.

The method may further comprise synchronizing a time of the end node with time indicated by the time information.

The time information indicates a time of a universal time domain.

According to embodiments of the present disclosure, a vehicle may obtain time information of a universal time domain, and set its time based on the obtained time information. Therefore, the time of the vehicle can be synchronized with the time of the universal time domain. After being synchronized with the universal time domain, the vehicle may notify the synchronized time information. Then, communication nodes (for example, a grand master node, switches, bridges, end nodes, etc.) belonging to working clock domains can obtain the notified time information, and set their time based on the obtained time information. Thus, the working clock domains can be synchronized with the universal time domain.

BRIEF DESCRIPTION OF DRAWINGS

Embodiments of the present disclosure will become more apparent by describing in detail embodiments of the present disclosure with reference to the accompanying drawings, in which.

Figure 1:
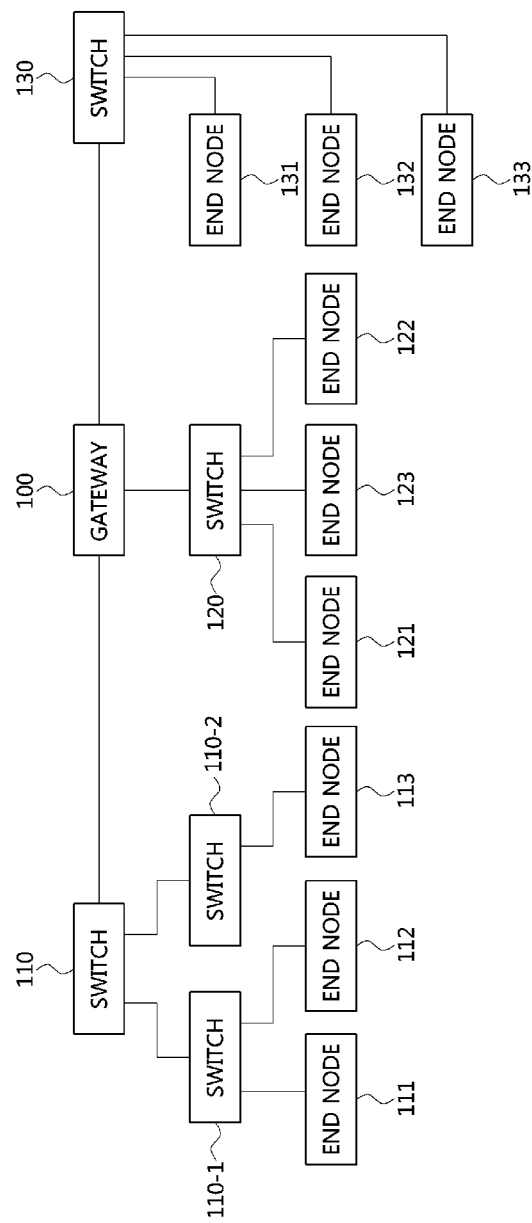
FIG. 1 is a diagram showing a vehicle network topology according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although forms are described herein as using a plurality of units to perform the exemplary process, it is understood that the exemplary processes may also be performed by one or plurality of modules. Additionally, it is understood that the term controller/controller unit/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Further, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, embodiments of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram showing a vehicle network topology according to embodiments of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a communication node which supports a controller area network (CAN) (or, FlexRay, media oriented system transport (MOST), local interconnect network (LIN), etc.) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, an around view monitoring device, etc.).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Embodiments of the present disclosure may be applied to the foregoing network topologies. The network topology to which forms of the present disclosure may be applied is not limited thereto and may be configured in various ways.

Figure 2:
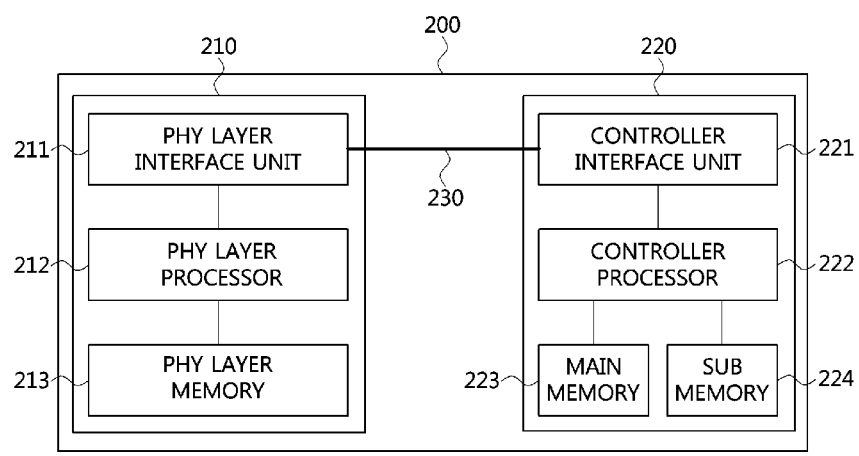
FIG. 2 is a diagram showing a communication node constituting a vehicle network according to embodiments of the present disclosure.

FIG. 2 is a diagram showing a communication node constituting a vehicle network according to embodiments of the present disclosure. Notably, the various methods discussed herein below may be executed by a controller unit having a processor and a memory.

As shown in FIG. 2, a communication node 200 of a network may include a PHY layer unit 210 and a controller unit 220. In addition, the communication node 200 may further include a regulator (not shown) for supplying power. In particular, the controller unit 220 may be implemented to include a medium access control (MAC) layer. A PHY layer unit 210 may be configured to receive or transmit signals from or to another communication node. The controller unit 220 may be configured to control the PHY layer unit 210 and perform various functions (e.g., an infotainment function, or the like.). The PHY layer unit 210 and the controller unit 220 may be implemented as one system on chip (SoC), or alternatively may be implemented as separate chips.

Further, the PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer unit 210 may include a PHY layer interface unit 211, a PHY layer processor 212, and a PHY layer memory 213. The configuration of the PHY layer unit 210 is not limited thereto, and the PHY layer unit 210 may be configured in various ways. The PHY layer interface unit 211 may be configured to transmit a signal received from the controller unit 220 to the PHY layer processor 212 and transmit a signal received from the PHY layer processor 212 to the controller unit 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface unit 221, a controller processor 222, a main memory 223, and a sub memory 224. The configuration of the controller unit 220 is not limited thereto, and the controller unit 220 may be configured in various ways. The controller interface unit 221 may be configured to receive a signal from the PHY layer unit 210 (e.g., the PHY layer interface unit 211) or an upper layer (not shown), transmit the received signal to the controller processor 222, and transmit the signal received from the controller processor 222 to the PHY layer unit 210 or upper layer. The controller processor 222 may further include an independent memory control logic or an integrated memory control logic for controlling the controller interface unit 221, the main memory 223, and the sub memory 224. The memory control logic may be implemented to be included in the main memory 223 and the sub memory 224 or may be implemented to be included in the controller processor 222.

Further, each of the main memory 223 and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller unit 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node will be described below, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
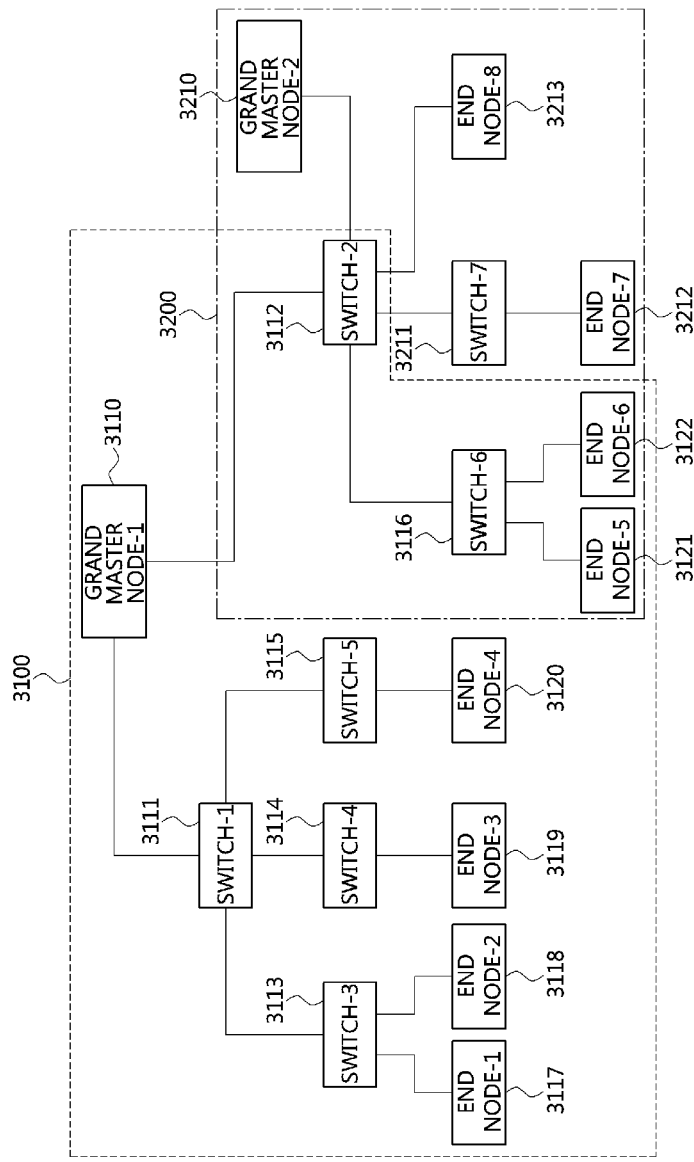
FIG. 3 is a conceptual view showing an example of a time-aware network.

FIG. 3 is a conceptual view showing an example of a time-aware network.

As shown in FIG. 3, a time-aware network may support IEEE 802.1AS (e.g., a generalized precision time protocol (gPTP), or the like), and may comprise a universal time domain 3100, and a working clock domain 3200. The universal time domain 3100 may be referred to as a primary domain, and the working clock domain 3200 may be referred to as a sub domain (or, secondary domain). Here, gPTP operations and time scales of respective domains may be independent from each other. Each of the domains belonging to the time-aware network may have its unique number (i.e., unique identifier). For example, the unique number may a value in a range of 0 to 127. However, the range of the unique number is not limited to the above example. That is, the range may exceed 127. In an industrial system, the unique number of the universal time domain 3100 may be set to '0,' and the unique number of the working clock domain may be set to one of 1 to 127. The domain, in the industrial system, may represent a country, a city, or a specific area belonging to a city.

Each of the universal time domain 3100 and the working clock domain 3200 may comprise a plurality of communication nodes. Also, communications nodes 3112, 3116, 3121, and 3122 belonging to both of the domains 3100 and 3200 may exist. A communication node may be a grand master node, a switch (or, bridge), or an end node. The communication nodes may be connected physically.

In the universal time domain 3100, a first grand master node 3110 may be a communication node in an uppermost level. The first grand master node 3110 may support a global positioning system (GPS). For example, the first grand master node 3110 may use the GPS to identify its position and notify its identified position. The communication nodes belonging to the universal time domain 3100 may operate based on time of the first grand master node 3110. For example, the communication nodes belonging to the universal time domain 3100 may be synchronized with the first grand master node 3110.

The first grand master node 3110 may be connected with a first switch 3111 and a second switch 3112. Also, the first switch 3111 may be connected to a third switch 3113, a fourth switch 3114, and a fifth switch 3115. The second switch 3112 may be connected to a second grand master node 3210, a sixth switch 3116, a seventh switch 3117, an eighth end node 3213. The third switch 3113 may be connected to a first end node 3117 and a second end node 3118. The fourth switch 3114 may be connected to a third end node 3119, and the fifth switch 3115 may be connected to a fourth end node 3120. The sixth switch 3116 may be connected to a fifth end node 3121 and a sixth end node 3122.

In the working clock domain 3200, the second grand master node 3210 may be a communication node in an uppermost level. The second grand master node 3210 may be synchronized with the first grand master node 3110. That is, the time of the working clock domain 3200 may be synchronized with the time of the universal time domain 3100. Alternatively, the time of the working clock domain 3200 may be configured based on an oscillator of the corresponding area. The communication nodes belonging to the working clock domain 3200 may operate based on the time of the second grand master node 3210. The second grand master node 3210 may be connected to the second switch 3112. The second switch 3112 may be connected to the first grand master node 3110, the sixth switch 3116, the seventh switch 3211, and the eighth end node 3213. The seventh switch 3211 may be connected to the seventh end node 3212.

The time-aware network may have various configurations without being restricted to the above example. For instance, in the time-aware network, domains may be arranged as described below.

Figure 4:
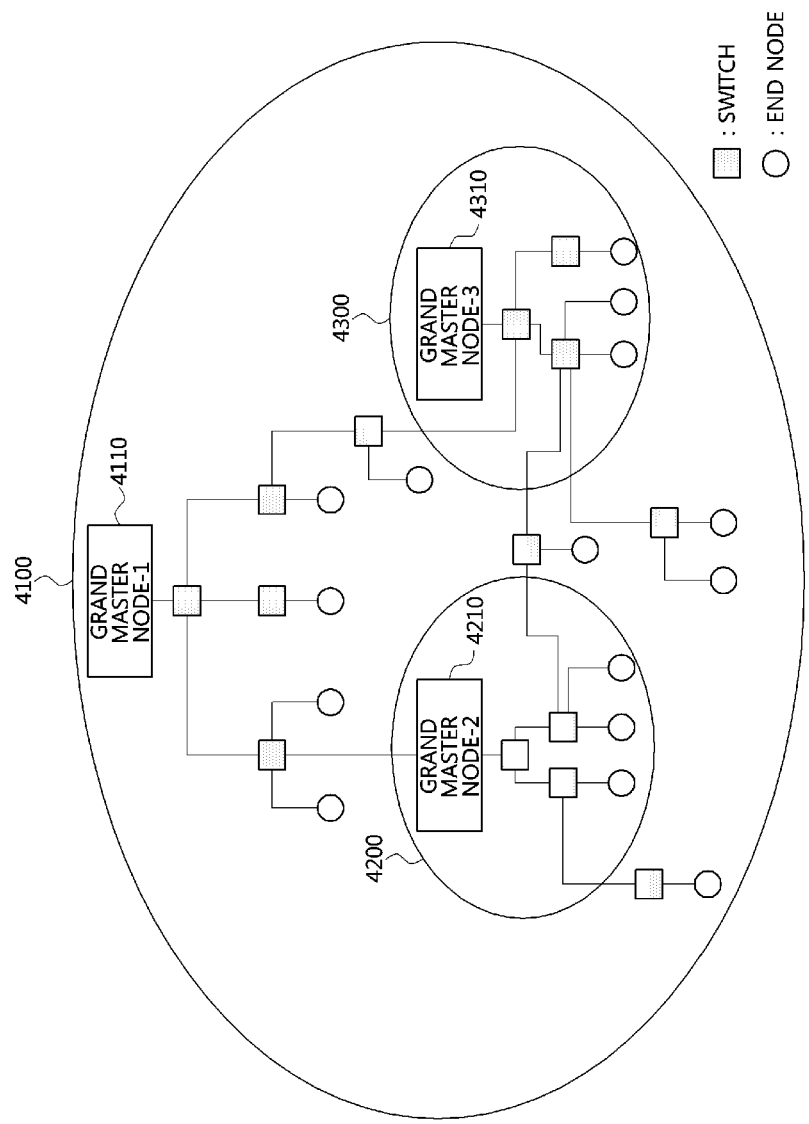
FIG. 4 is a conceptual view showing an example of arrangement of domains.

FIG. 4 is a conceptual view showing an example of arrangement of domains.

As shown in FIG. 4, a programmable logic controller (PLC) based factory network may comprise a plurality of domains 4100, 4200, and 4300. A universal time domain 4100 may comprise a first working clock domain 4200 and a second working clock domain 4300. The communication nodes included in the universal time domain 4100 may operate based on time of a first grand master node 4110. The first working clock domain 4200 may be connected physically to the universal time domain 4100. For example, a second grand master node 4210 may be physically connected to a switch included in the universal time domain 4100. In this case, the second grand master node 4210 may be synchronized with the first grand master node 4110, and the communication nodes in the first working clock domain 4200 may operate based on time of the second grand master node 4210. Alternatively, the communication nodes include in the first working clock domain 4200 may operate based on time independent from that of the universal time domain 4100. The first working clock domain 4200 may be physically connected to the second working clock domain 4300.

The second working clock domain 4300 may be physically connected to the universal time domain 4100. For example, switches included in the second working clock domain 4300 may be physically connected to switches included in the universal time domain 4100. In this case, a second grand master node 4310 may be synchronized with the first grand master node 4110, and the communication nodes included in the second working clock domain 4300 may operate based on time of the third grand master node 4310. Alternatively, the communication nodes included in the second working clock domain 4300 may operate based on time independent from that of the universal time domain 4100.

Figure 5:
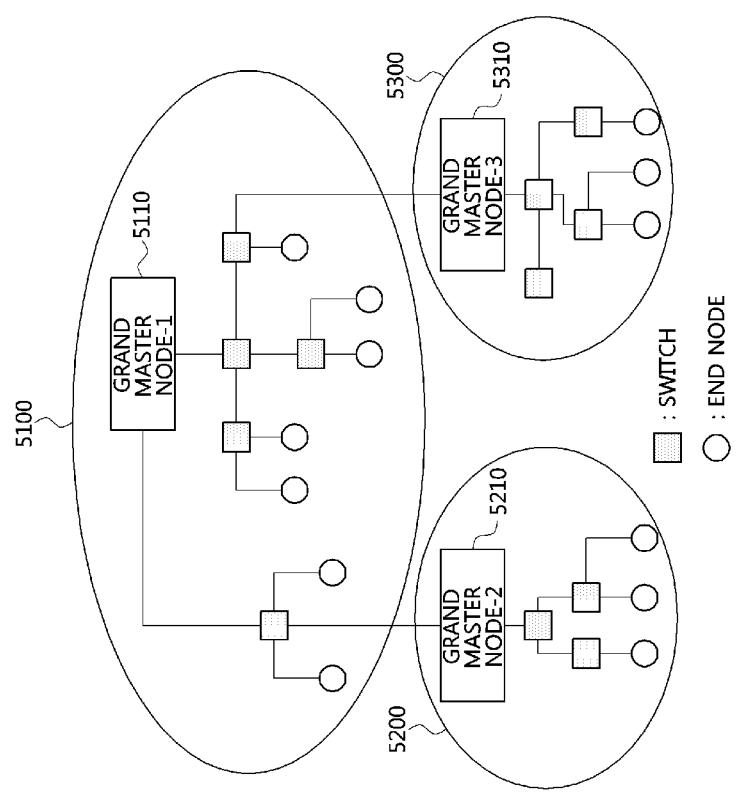
FIG. 5 is a conceptual view showing another example of arrangement of domains.

FIG. 5 is a conceptual view showing another example of arrangement of domains.

As shown in FIG. 5, a PLC based factory network may comprise a plurality of domains 5100, 5200, and 5300. The plurality of working clock domains 5100, 5200, and 5300 may be connected to each other. For example, a second grand master node 5210 of the second working clock domain 5200 may be connected with a switch included in the first working clock domain 5100, and a third grand master node 5310 of the third working clock domain 5300 may be connected to a switch included in the first working clock domain 5100. In this case, the first working clock domain 5100 may operate as a primary domain, and the second working clock domain 5200 and the third working clock domain 5300 may operate as sub domains.

Thus, the second grand master node 5210 may be synchronized with the first grand master node 5110, and communication nodes included in the second working clock domain 5200 may operate based on time of the second grand master node 5210. A third grand master node 5310 may be synchronized with the first grand master node 5110, and communication nodes included in the third working clock domain 5300 may operate based on time of the third grand master node 5310.

Alternatively, the working clock domains 5100, 5200, and 5300 may be separated from each other. In this case, the working clock domains 5100, 5200, and 5300 may operate based on independent times, and accordingly synchronization among them may not be established. Meanwhile, in the case that synchronization among domains in the time-aware factory network is not acquired, the nodes belonging to the factory network may malfunction.

On the other hand, a wireless access in vehicular environment (WAVE) is an intelligent transportation system (ITS) communication technology for providing high-speed vehicles with communication services, and modified to be suitable for vehicular environments from a wireless local area network (WLAN) technology. The WAVE may support a vehicle-to-infrastructure (V2I) or vehicle-to-vehicle (V2V) communication which is a type of dedicated short range communication (DSRC) technologies.

IEEE 802.11a/g, which is one of the conventional WLAN technologies, may be suitable to indoor environments, and does not support mobility. On the contrary, the WAVE can support mobility, and support reliable communications even in outdoor environments where interferences due to Doppler shifts exist. For example, the WAVE can support a fast link connection between an on-board unit (OBU) installed in a vehicle moving at a velocity up to maximum of 160 Km/h and a road-side unit (RSU) installed in road side, and high-speed data communications up to 27 Mbps. The WAVE has the following layers, as described below.

Figure 6:
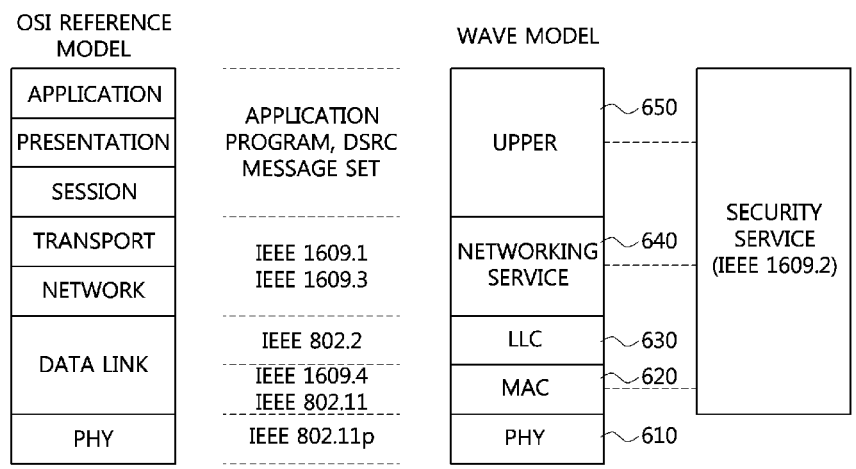
FIG. 6 is a conceptual view showing layers of WAVE.

FIG. 6 is a conceptual view showing layers of WAVE.

As shown in FIG. 6, the WAVE model may comprise a physical (PHY) layer 610, a medium access control (MAC) layer 620, a logical link control (LLC) layer 630, a networking service layer 640, and an upper layer 650. The PHY layer 610 may support IEEE 802.11p, etc., and correspond to a PHY layer according to an open system interconnection (OSI) reference model. The MAC layer 620 may support IEEE 1609.4, IEEE 802.11, etc., and correspond to a data link layer according to the OSI reference model. The LLC layer 630 may support IEEE 802.2, etc., and correspond to a data link layer according to the OSI reference model.

The networking service layer 640 may support IEEE 1609.1, IEEE 1609.3, or the like, and correspond to a network layer and a transport layer according to the OSI reference model. The upper layer 650 may support application programs, a DSRC message set, or the like, and correspond to a session layer, a presentation layer, and an application layer according to the OSI reference model. The MAC layer 620, networking service layer 640, and upper layer 650 may support security services defined in IEEE 1609.2.

Meanwhile, the IEEE 802.11p is a standard for V2V communications, and may interoperate with the IEEE 1609 series standards defining a channel access procedure of a vehicle in a multi-channel environment. The channels for V2V communications are defined in the IEEE 802.11p as described below.

Figure 7:
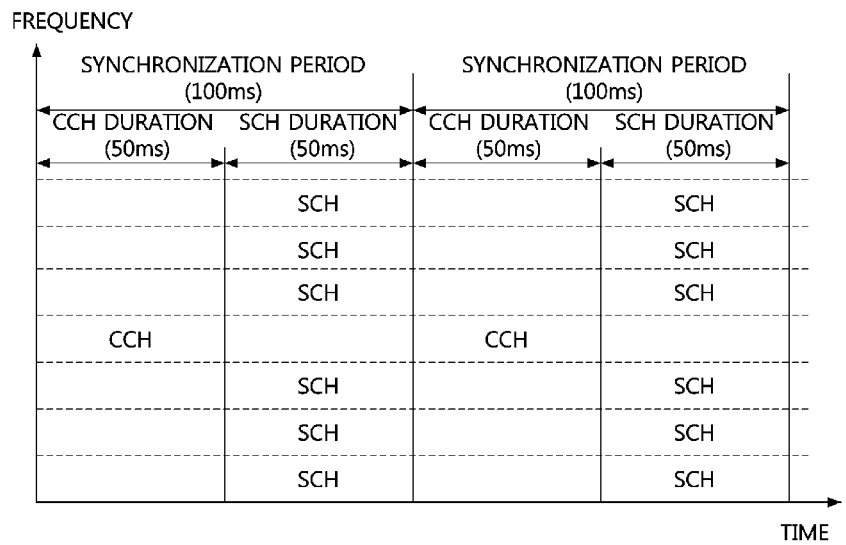
FIG. 7 is a conceptual view showing IEEE 802.11p channels for vehicle-to-vehicle (V2V) communications.

FIG. 7 is a conceptual view showing IEEE 802.11p channels for V2V communications.

As shown in FIG. 7, a synchronization period may have the length of 100 ms. 50 ms of the synchronization period may be configured to be a control channel (CCH) duration, and the rest 50 ms of the synchronization period may be configured to be a service channel (SCH) duration. A single CCH may be configured in the CCH duration, and a frame comprising control information, management information, safety-related information, high priority information, etc. may be transmitted through the CCH. For example, multi-channel synchronization information, channel access information, vendor-specific information, master information block (MIB) maintenance information, readdressing information, other IEEE 802.11 service information, or the like may be transmitted through the CCH. Six SCHs may be configured in the SCH duration, and user information, data, or the like may be transmitted through the SCHs.

Meanwhile, frames can be transmitted and received in the IEEE 802.11p as described below.

Figure 8:
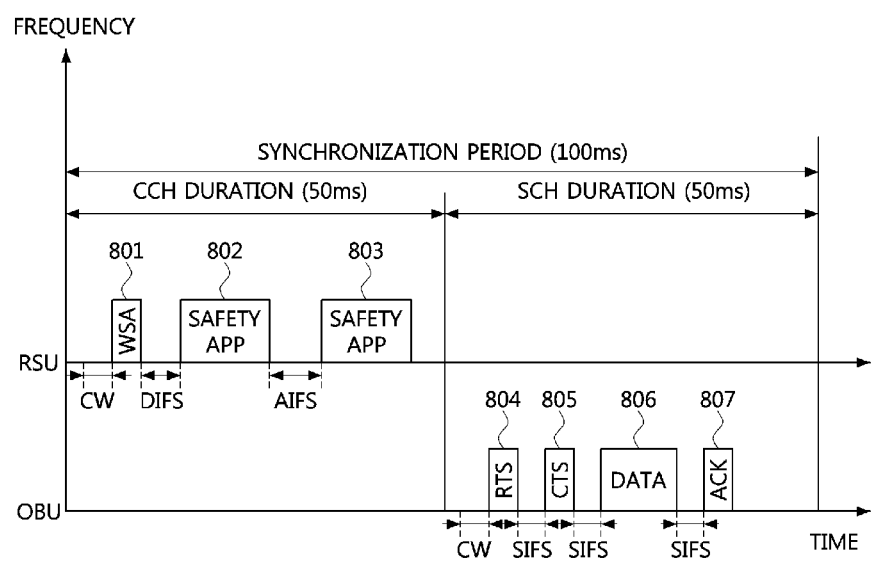
FIG. 8 is a timing diagram showing frame transceiving procedure in IEEE 802.11p.

FIG. 8 is a timing diagram showing frame transceiving procedure in IEEE 802.11p.

As shown in FIG. 8, in a case that a CCH is in idle state in the CCH duration, a RSU may perform a random backoff procedure. For example, in a case that the CCH is maintained in the idle state during a contention window (CW) duration according to the random backoff procedure, the RSU may transmit a WAVE service advertisement (WSA) frame 801 through the CCH. Also, the RSU may transmit a safety application (APP) related frame 802 through the CCH after a lapse of a distributed interface space (DIFS) from an end point of the WSA frame 801. Also, the RSU may transmit a safety APP related frame 803 through the CCH after a lapse of an arbitration interframe space (AIFS) from an end point of the safety APP related frame 802.

Meanwhile, in a case where a SCH is in idle state in the SCH duration, an OBU may perform a random backoff procedure. For example, in a case where the SCH is maintained in the idle state during a CW duration according to the random backoff procedure, the OBU may transmit a request-to-send (RTS) frame 804 through the SCH. The OBU may receive a clear-to-send (CTS) frame 805 from one of other communication nodes (e.g., an RSU or another OBU, etc.) after a lapse of a SIFS from an end point of the RTS frame 804. Also, the OBU may transmit a data frame 806 through the SCH after a lapse of a SIFS from an end point of the CTS frame 805. The OBU may receive an acknowledgement (ACK) frame 807 through the SCH after a lapse of a SIFS from an end point of the data frame 806. In a case that the OBU successfully receives the ACK frame 807 in response to the data frame 806, the OBU may determine that the data frame 806 has been successfully received at the corresponding communication node.

Meanwhile, the communication nodes (e.g., the OBU, the RSU, etc.) may perform communications based on a WAVE short message protocol (WSMP). For example, V2I communications between RSU and OBU may be performed based on the WSMP, and V2V communications between OBUs may also be performed based on the WSMP. The WSPM used for the communications between communication nodes will be described below.

Figure 9:
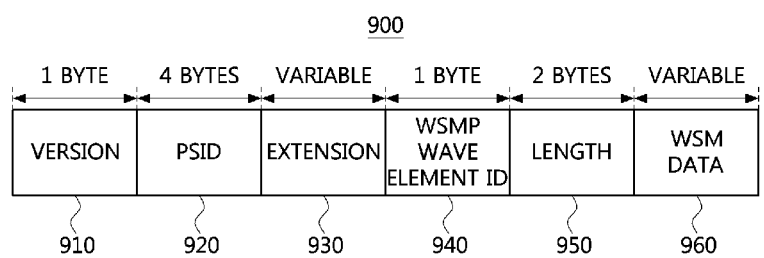
FIG. 9 is a block diagram showing a WAVE short message protocol (WSMP) frame.

FIG. 9 is a block diagram showing a WSMP frame.

As shown in FIG. 9, a WSMP frame 900 may comprise a WSMP header and a WSM data field 960. A user data having the length of at most 512 bytes may be transmitted through the WSMP frame 900. Also, the WSMP header may comprise a version field 910, a provider service identifier (PSID) field 920, an extension field 930, a WSMP WAVE element identifier (ID) field 940, and a length field 950. The version field may have the length of 1 byte, and indicate a version of WSMP. The PSID field may have the length of 4 bytes, and include an identifier of a service provided by a service provider.

The extension field 930 may comprise information on a channel number, a transmission rate, a transmission power, or the like, and the length of the extension field 930 may be variable. The WSMP WAVE element ID field 940 may have the length of 1 byte, and include an identifier of WAVE elements. The length field 950 may have the length of 2 bytes, and indicate the length of the WSM data field 960. The WSM data field 960 may comprise data used by an upper layer, and the length of the WSM data field may be variable.

On the other hand, for time synchronization between the above-described domains, the domains should be physically connected with each other. Therefore, a domain existing independently without a physical connection (hereinafter, referred to as an "independent domain") may not be synchronized with other domains. However, when a communication node with mobility (e.g., a communication node included in a vehicle) exists, the communication node with mobility may notify its domain time information, and communication nodes belonging to the domain may be synchronized based on the notified time information. Here, the time of the domain may mean reference time, and communication nodes belonging to the domain may operate based on the reference time. In the below description, a time synchronization method by a communication node with mobility will be explained below.

Figure 10:
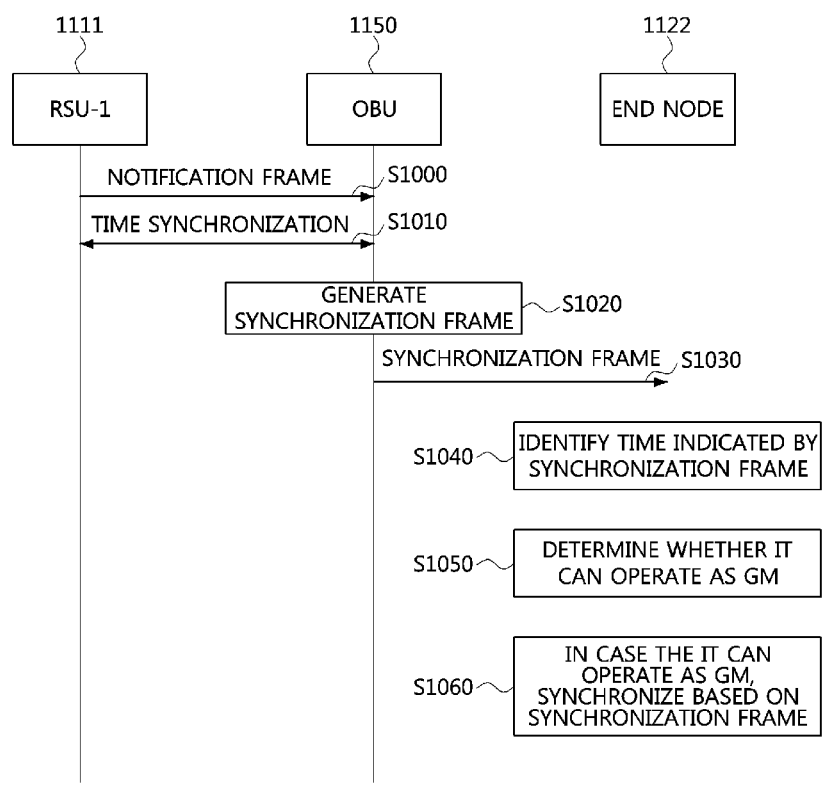
FIG. 10 is a sequence chart showing a time synchronization method according to embodiments of the present disclosure.
Figure 11:
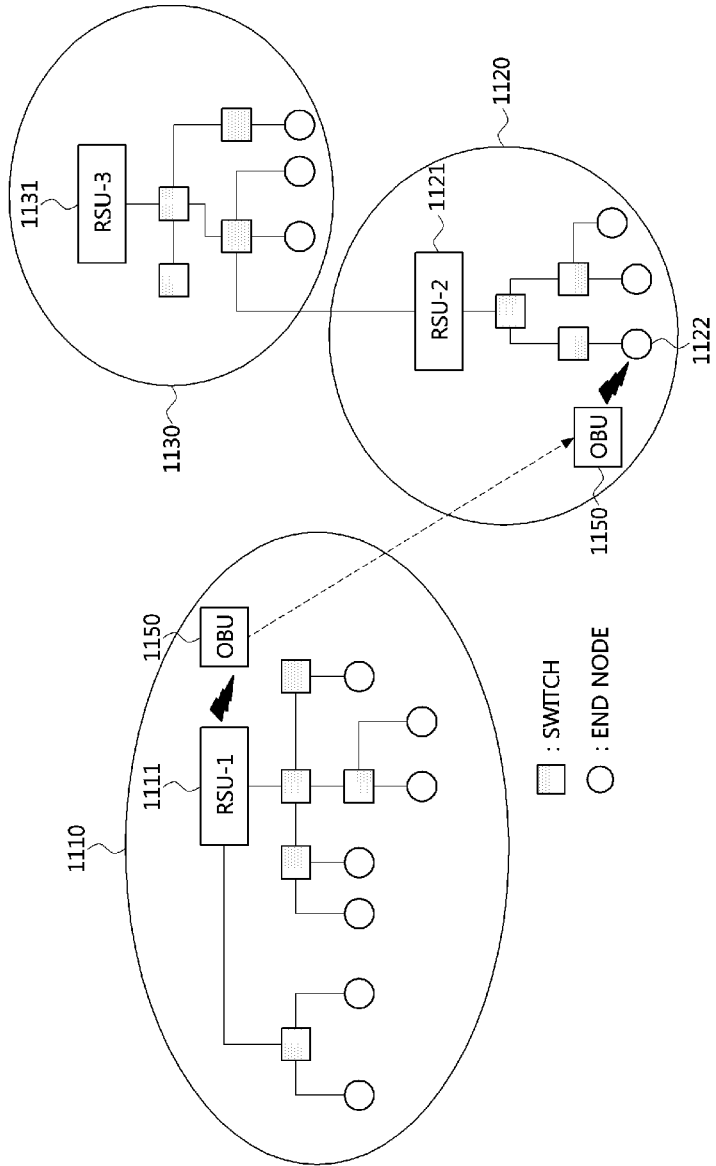
FIG. 11 is a conceptual view showing embodiments of a network to which the time synchronization method is applied.

FIG. 10 is a sequence chart showing a time synchronization method according to embodiments of the present disclosure, and FIG. 11 is a conceptual view showing embodiments of a network to which the time synchronization method is applied.

As shown in FIGS. 10 and 11, a network may comprise a universal time domain 1110, a first working clock domain 1120, and a second working clock domain 1130. The domains 1110, 1120, and 1130 may exist independently from each other without physical connections. A first RSU 1111 may be a grand master node of the universal time domain 1110, a second RSU 1121 may be a grand master node of the first working clock domain 1120, and a third RSU 1131 may be a grand master node of the second working clock domain 1130. The OBU 1150 may be a communication node having mobility. For example, the OBU 1150 may be a communication node included in a vehicle, and the vehicle may form a domain.

The first RSU 1111 may generate a notification frame including time information indicating its time (e.g., reference time). Also, the notification frame may further comprise information on a position of the first RSU 1111 (e.g., latitude and longitude of the RSU 1111). For example, when the first RSU 1111 supports GPS, the first RSU 1111 may identify its position through the GPS, and generate the notification frame by using the identified position. Also, the notification frame may further comprise priority information (e.g., type identifier) indicating the type of the domain to which the first RSU 1111 belongs. For example, since the first RSU 1111 belongs to the universal time domain 1110, the priority information of the notification frame of the first RSU 1111 may be set to '0.'

The notification frame may be generated based on the WSMP, and the time information, position information, and priority information may be included in a WSM data field of the notification frame. Here, the time information of the first RSU 1111 indicates time information of the universal time domain 1110, the position information of the first RSU 1111 indicates position information of the universal time domain 1110. The first RSU 1111 may transmit the notification frame periodically or non-periodically (S1000). The notification frame may be transmitted through a CCH or a SCH between the first RSU 1111 and the OBU 1150.

When the OBU 1150 is located within communication coverage of the first RSU 1111, the OBU 1150 can receive the notification frame from the first RSU 1111, and perform a time synchronization procedure with the first RSU 1111 based on the received notification frame (S1010). The time synchronization procedure between the OBU 1150 and the first RSU 1111 may be performed as described below.

Figure 12:
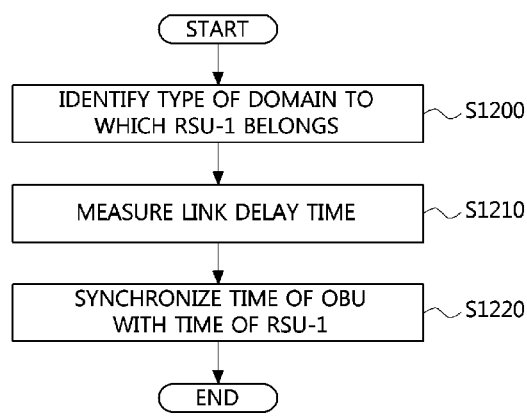
FIG. 12 is a flow chart showing a time synchronization method performed in an on-board unit (OBU)

FIG. 12 is a flow chart showing a time synchronization method performed in an OBU.

As shown in FIG. 12, the OBU 1150 may obtain the priority information from the notification frame, and identify the type of the domain to which the first RSU 1111 belongs based on the obtained priority information (S1200). For example, in the case where the priority information is set to '0,' the OBU 1150 may determine that the first RSU 1111 belongs to the universal time domain. In the case where the first RSU 1111 belongs to the universal time domain, the OBU 1150 may obtain the time information and the position information of the universal time domain from the notification frame. On the contrary, in the case where the priority information is set to a value other than '0' (e.g., one of '1' to '7', when the priority field included in the notification frame has the length of 3 bits), the OBU 1150 may determine that the first RSU 1111 belongs to a working clock domain. In the case where the first RSU 1111 belongs to a working clock domain, the OBU 1150 may discard the received notification frame.

In the case where the first RSU 1111 belongs to the universal time domain, the OBU 1150 may measure a link delay time with the first RSU 1111 (S1210). For example, the OBU 1150 may transmit a delay request frame to the first RSU 1111, and record a transmission time of the delay request frame (hereinafter, 'RSU1$_{time1}$'). The first RSU 1111 may receive the delay request frame the OBU 1150, and record a reception time of the delay request frame (hereinafter, 'RSU1$_{time2}$'). The first RSU 1111 may transmit a delay response frame including information indicating the RSU1$_{time2}$ to the OBU 1150, record a transmission time of the delay response frame (hereinafter, 'RSU1$_{time3}$'), and transmit a follow-up frame including information indicating the RSU1$_{time3}$ to the OBU 1150. The follow-up message may be transmitted immediately after the transmission of the delay response frame.

The OBU 1150 may receive the delay response frame from the first RSU 1111, record the reception time of the delay response frame (hereinafter, 'RSU1$_{time4}$'), and obtain the RSU1$_{time2}$ from the delay response frame. Also, the OBU 1150 may receive the follow-up frame from the first RSU 1111, and obtain the RSU1$_{time3}$ from the follow-up frame. The frames used for the link delay time measurement may be transmitted through a CCH or SCH between the OBU 1150 and the first RSU 1111. The OBU 1150 may measure the link delay time between the OBU 1150 and the first RSU 1111 based on Equation 1 below.

$$\text{link delay time} = \frac{(RSU1_{time2} - RSU1_{time1}) + (RSU1_{time4} - RSU1_{time3})}{2} \quad [\text{Equation 1}]$$

Alternatively, in the case where the OBU 1150 supports GPS, the OBU 1150 may identify its position using the GPS, and identify the position information of the first RSU 1111 from the notification frame. In this case, the OBU 1150 may calculate a distance between the OBU 1150 and the first RSU 1111 based on the positions of the OBU 1150 and the first RSU 1111, and estimate the link delay time between the OBU 1150 and the first RSU 1111.

The OBU 1150 may set its time based on a value of "time indicated by the time information of the notification frame+ link delay time" (S1220). Therefore, the time of the OBU 1150 may be synchronized with the time of the universal time domain 1110. Here, the procedure of measuring the link delay time may be skipped. That is, in the case that the link delay is already applied to the time information of the notification frame, the OBU 1150 may set its time simply with the time indicated by the time information of the notification frame.

Referring again to FIGS. 10 and 11, the OBU 1150 may generate a synchronization frame (S1020). The synchronization frame may be generated based on WSMP, and configured as described below.

Figure 13:
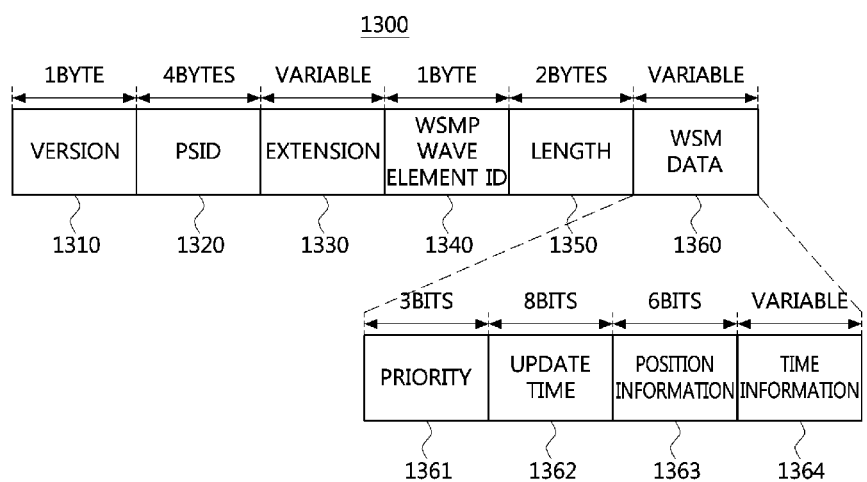
FIG. 13 is a block diagram showing a synchronization frame according to embodiments of the present disclosure.

FIG. 13 is a block diagram showing a synchronization frame according to embodiments of the present disclosure.

As shown in FIG. 13, a synchronization frame 1300 may comprise a WSMP header and a WSM date field 1360. User data having the length of at most 512 bytes may be transmitted through the synchronization frame 1300. Also, the WSMP header may comprise a version field 1310, a PSID field 1320, an extension field 1330, a WSMP WAVE element ID field 1340, and a length field 1350. The fields included in the WSMP header of the synchronization frame 1300 may be identical to or similar with those included in the WSMP header of the WSMP frame 900 explained with reference to FIG. 9.

The WSM data field 1360 may comprise a priority field 1361, an update time field 1362, a position information field 1363, and a time information field 1364. The length of the WSM data field 1360 may be variable. The priority field 1361 may have the size of 3 bits, and indicate the type of the domain to which the RSU 1111 synchronized with the OBU 1150 belongs. For example, the priority field 1361 may be configured to be a value of 0 to 7. The priority field 1361 configured as '0' may indicate the universal time domain, and the priority field 1361 configured as a value of '1' to '7' may indicate a working clock domain.

The update time field 1362 may have the size of 8 bits, and indicate time at which the time of the OBU 1150 has been updated. The position information field 1363 may have the size of 6 bits, and indicate the position of the RSU 1111 synchronized with the OBU 1150 (i.e., information on a position of the domain to which the RSU 1111 belongs). Also, the position information field 1363 may indicate a position of the OBU 1150. The position information may include latitude and longitude. The time information field 1364 may indicate time of the OBU 1150 (e.g., time of the OBU 1150 synchronized with time of the universal time domain 1110). The length of the time information field 1364 may be variable.

As shown in FIGS. 10 and 11, the OBU 1150 may transmit the synchronization frame periodically or aperiodically (S1030). Here, the vehicle including the OBU 1150 may move, and accordingly the OBU 1150 may be located in a domain such as a first working clock domain 1120 or second working clock domain 1130) other than the universal time domain 1110. For example, in a case where the OBU 1150 is located in the first working clock domain 1120, the end node 1122 belonging to the first working clock domain 1120 may receive the synchronization frame from the OBU 1150. Hereinafter, a time synchronization method performed by the end node 1122 receiving the synchronization frame will be described. However, other communication nodes (e.g., switches or bridges) belonging to the first working clock domain 1120 may perform the below time synchronization method.

Since the priority field included in the synchronization frame indicates the type of the domain operating by using the time indicated by the synchronization frame as a reference, the end node 1122 may identify the type of the domain based on the priority field included in the synchronization frame. For example, in a case where the priority field of the synchronization frame is configured to a value of '1' to '7', the end node 1122 may identify that the type of the domain is a working clock domain. In the case that the type of the domain is the working clock domain type, the end node 1122 may discard the synchronization frame. On the contrary, if the priority field of the synchronization frame is configured as '0', the end node 1122 may identify that the type of domain is the universal time domain. In the case where the type of domain is the universal time domain, the end node 1122 may identify the time indicated by the time information field included in the synchronization frame (S1040). Here, the identified time may be used as reference time for time synchronization.

Also, when the end node 1122 receives a plurality of synchronization frames, the end node 1122 may check update times indicated by respective update time fields of the plurality of synchronization frames, and identify a synchronization frame having the latest update time. The end node 1122 may discard synchronization frame except the synchronization frame having the latest update time. If a synchronization frame having the latest update time exists, the end node 1122 may identify the time indicated by the time information included in the corresponding synchronization frame.

When a plurality of synchronization frames having the latest update time exist (that is, when a plurality of synchronization frames have the same latest update time), the end node 1122 may identify positions indicated by respective position information fields of the plurality of synchronization frames. Based on the identified positions, the end node 1122 may identify distances between the end node 1122 and the universal time domains (e.g., RSUs belonging to the respective universal time domains), and identify the synchronization frame having information of the nearest universal time domain. The end node 1122 may discard synchronization frame except the synchronization frame information of the nearest universal time domain. The end node 1122 may identify the time indicated by the synchronization frame having information of the nearest universal time domain.

Also, the end node 1122 may measure a link delay time with the OBU 1150. For example, the end node 1122 may transmit a delay request frame to the OBU 1150, and record a transmission time of the delay request frame (hereinafter, 'EndNode$_{time1}$'). The OBU 1150 may receive the delay request frame the end node 1122, and record a reception time of the delay request frame (hereinafter, 'EndNode$_{time2}$'). The OBU 1150 may transmit a delay response frame including information indicating the EndNode$_{time2}$ to the end node 1122, record a transmission time of the delay response frame (hereinafter, 'EndNode$_{time3}$'), and transmit a follow-up frame including information indicating the EndNode$_{time3}$ to the end node 1122. The follow-up message may be transmitted immediately after the transmission of the delay response frame.

The end node 1122 may receive the delay response frame from the OBU 1150, record the reception time of the delay response frame (hereinafter, 'EndNode$_{time4}$'), and obtain the EndNode$_{time2}$ from the delay response frame. Also, the end node 1122 may receive the follow-up frame from the OBU 1150, and obtain the EndNode$_{time3}$ from the follow-up frame. The frames used for the link delay time measurement may be transmitted through a CCH or SCH between the end node 1122 and the OBU 1150. The end node 1122 may measure the link delay time between the end node 1122 and the OBU 1150 based on Equation 2 below.

$$\text{link delay time} = \frac{(EndNode_{time2} - EndNode_{time1}) + (EndNode_{time4} - EndNode_{time3})}{2} \quad \text{[Equation 2]}$$

Alternatively, in the case where the end node 1122 supports GPS, the end node 1122 may identify its position using the GPS, and identify the position information of the OBU 1150 from the synchronization frame. In this case, the end node 1122 may calculate a distance between the end node 1122 and the OBU 1150 based on the positions of the end node 1122 and the OBU 1150, and estimate the link delay time between the end node 1122 and the OBU 1150. The end node 1122 may determine a value of 'time indicated by the time information of the synchronization frame+link delay time' as the time of RSU 1111 (or, the OBU 1150). Here, the step of measuring the link delay time may be skipped. In this case, the end node 1122 may determine the time indicated by the time information of the synchronization frame as the time of RSU 1111 (or, the OBU 1150).

The end node 1122 may determine whether it can operate as a grand master node (S1050). For example, the end node 1122 may identify whether a grand master (GM) policy of the first working clock domain 1120 is a static GM policy or a dynamic GM policy. In a case where the GM policy of the first working clock domain 1120 is the static GM policy, other communication nodes except a predetermined grand master node cannot operate as a grand master node. On the contrary, in a case where the GM policy of the first working clock domain 1120 is the dynamic GM policy, other communication nodes as well as the predetermined grand master node can operate as a grand master node. Also, the end node 1122 may identify whether or not it can support functions of a grand master node (such as, GPS, etc.)

In the case where the end node 1122 cannot operate as a grand master node (for example, when the GM policy of the working clock domain 1120 is the static GM policy, or when the end node 1122 does not support grand master node functions), the end node 1122 may notify the time information of the RSU 1111 (or, the OBU 1150) indicated by the synchronization frame received from the OBU 1150, to the grand master node RSU 1121. For example, the end node 1122 may generate a synchronization frame including the time information of the RSU 1111 (or, the OBU 1150), and transmit the generated synchronization frame to the RSU 1121. Here, the end node 1122 may transmit the synchronization frame to the RSU 1121 in multicast manner or broadcast manner. The synchronization frame may be identical to or similar with the synchronization frame 1300 explained referring to FIG. 13.

The RSU 1121 may receive the synchronization frame including the time information of the RSU 1111 (or, the OBU 1150), and synchronize its time with the time indicated by the time information of the synchronization frame. The RSU 1121 may generate a synchronization frame including its time information, and transmit the generated synchronization frame to other communication nodes belonging to the first working clock domain 1120. The communication nodes belonging to the first working clock domain 1120 may synchronize their time with the time indicated by the time information of the synchronization frame received from the RSU 1121. Here, the link delay time between communication nodes may be applied to the time indicated by the time information of the synchronization frame, and thus time synchronization errors due to the link delay may not occur. According to the above-described time synchronization method (that is, the time synchronization method for a case in which the end node 1122 cannot operate as a grand master node), time required for the time synchronization may increase due to environments of the domain (e.g., the number of hops, topology structures, etc.)

Meanwhile, the RSU 1121 may receive a plurality of synchronization frames. For example, the RSU 1121 may receive synchronization frames from other OBUs as well as the end node 1122. In this case, the RSU 1121 may operate as described below.

Figure 14:
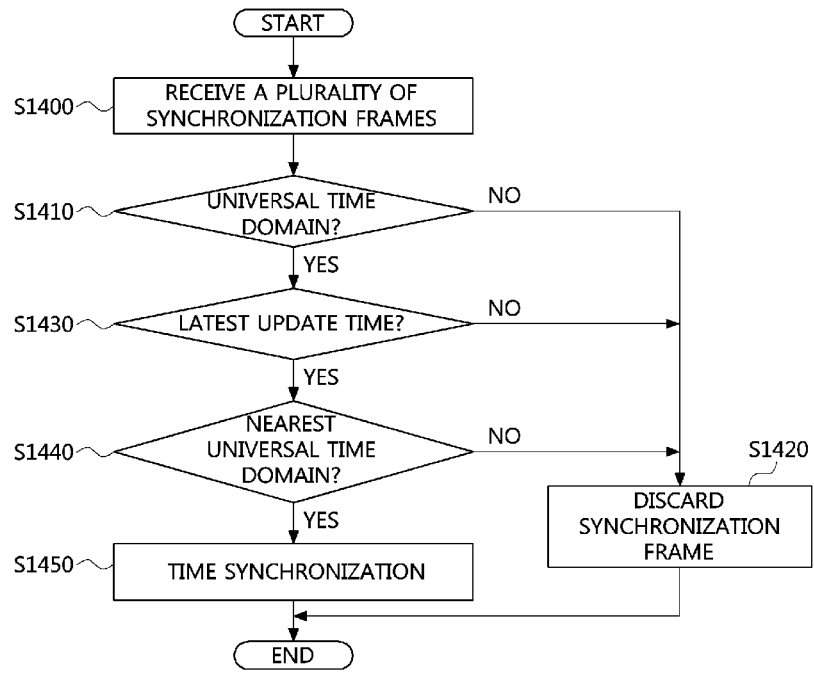
FIG. 14 is a flow chart showing a time synchronization method performed in a grand master node.

FIG. 14 is a flow chart showing a time synchronization method performed in a grand master node.

As shown in FIG. 14, the second RSU 1121 may receive a plurality of synchronization frames (S1400). The second RSU 1121 may identify types of the respective domains from the priority information fields included in the plurality of synchronization frames (S1410). For example, in the case where the priority information field of the received synchronization frame is set to '0,' the second RSU 1121 may identify the type of the domain to which the corresponding OBU belongs as the universal time domain. On the contrary, in the case that the priority information field of the received synchronization frame is set to a value other than '0' (e.g., a value of '1' to '7'), the second RSU 1121 may identify the type of the domain to which the corresponding OBU belongs as the working clock domain. In the case where the type of the domain is the working clock domain, the second RSU 1121 may discard the corresponding synchronization frame (S1420).

When a single synchronization frame including information indicating the universal time domain type exists, the second RSU 1121 may perform time synchronization of the second RSU 1121 based on the time information included in the corresponding synchronization frame (S1450). However, when a plurality of synchronization frames indicating the universal time domain type exist, the second RSU 1121 may identify update times indicated by the respective update time fields of the plurality of synchronization frames, and identify a synchronization frame having the latest update time (S1430). The second RSU 1121 may discard synchronization frames except the synchronization frame having the latest update time (S1420).

When a single synchronization frame having the latest update time exists, the second RSU 1121 may perform time synchronization of it based on the time information included in the corresponding synchronization frame (S1450). When a plurality of synchronization frames having the latest update time exist (i.e., a plurality of synchronization frames having the same update time exist), the RSU may identify positions of the respective OBUs based on position information fields of the plurality of synchronization frames. The second RSU 1121 may identify distances from the second RSU 1121 to the respective universal time domains based on the position information, and identify the synchronization frame of the closest universal time domain (S1440). The second RSU 1121 may discard synchronization frames except the synchronization frame of the closest universal time domain (S1420). The second RSU 1121 may perform time synchronization based on the time information included in the synchronization frame including information on the closest universal time domain (S1450).

As shown in FIGS. 10 and 11, in a case where the end node 1122 can operate as a grand master node (for example, when the GM policy of the first working clock domain 1120 is the dynamic GM policy, or when the end node 1122 support grand master node functions), the end node 1122 may perform time synchronization for communication nodes belonging to the working clock domain 1120 (S1060). For example, the end node 1122 may synchronize its time with the time of the RSU 1111 (or, the OBU 1150) identified based on the synchronization frame. The end node 1122 may generate a synchronization frame including its time information. Here, the end node 1122 may be changed to a grand master node. In this case, the end node 1122 may indicate that it is the grand master node, by changing a parameter 'gmPresent' from 'false' to 'true'. The 'gmPresent' parameter configured as 'false' indicates that the corresponding communication node is not a grand master node, and the 'gmPresent' parameter configured as 'true' indicates that the corresponding communication node is a grand master node.

The synchronization frame may further include information indicating a GM priority of the end node 1122. The GM priority may be respective priorities of a plurality of GMs, when the plurality of GMs exist in the working clock domain 1120. The GM priorities may be configured in advance when the working clock domain 1120 is formed, and each communication node belonging to the working clock domain 1120 may know its GM priority. As the value indicated by the GM priority is lower, the higher priority may be indicated. For example, the GM priority configured as '0' may indicate the highest priority. The GM priority of the grand master node preconfigured for the working clock domain 1120 (e.g., the RSU 1121) may be set to '0', and the GM priorities of the rest of the communication nodes may be set to values higher than '0'.

The end node 1122 may transmit the synchronization frame including its time information the information indicating its GM priority. The synchronization frame may be transmitted in multicast manner or in broadcast manner. The communication node belonging to the working clock domain 1120 may receive the synchronization frame from the end node 1122, and synchronize its time with the time indicated by the time information of the end node 1122 included in the synchronization frame. Also, the communication node belonging to the working clock domain 1120, when it knows the link delay time between communication nodes, may synchronize its time with "the time indicated by the time information of the end node 1122+the link delay time." Alternatively, the link delay time between communication nodes may be applied to the time indicated by the time information of the synchronization frame, and thus time synchronization errors due to the link delay may not occur.

Meanwhile, when a plurality of grand master nodes exist in the working clock domain 1120, for time synchronization, each of the plurality of grand master nodes may transmit a synchronization frame including its time information. Thus, communication nodes (e.g., the grand master node (e.g., RSU 1121), switches, end nodes (e.g., end node 1122), etc.) belonging to the working clock domain 1120 may receive a plurality of synchronization frames including time information. In this case, the communication node may operate as follows.

Figure 15:
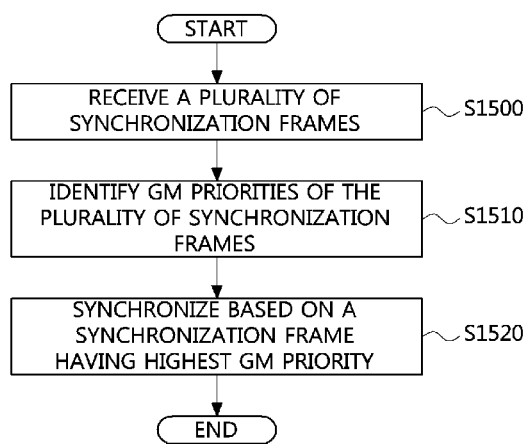
FIG. 15 is a flow chart showing a time synchronization method performed in a communication node.

FIG. 15 is a flow chart showing a time synchronization method performed in a communication node.

As shown in FIG. 15, a communication node may receive a plurality of synchronization frames (S1500). Here, the plurality of synchronization frames may be generated by grand master nodes belonging to the working clock domain 1120. Each of the synchronization frames may comprise time information and information indicating a GM priority of the corresponding grand master node. Then, the communication node may identify respective GM priorities of the received plurality of synchronization frames (S1510). The communication node may select a single synchronization frame having the highest GM priority (e.g., the GM priority value configured as '0') among the plurality of synchronization frames, and discard the rest of the synchronization frames. The communication node may obtain time information from the selected synchronization frame, and synchronize its time with the time indicated by the obtained time information (S1520).

On the other hand, in the case where the communication node is the grand master node, the communication mode may compare its GM priority with the GM priority indicated by the received synchronization frame. When the GM priority of the communication node is higher than the GM priority indicated by the received synchronization frame, the communication node may discard the received synchronization frame. That is, the working clock domain 1120 may be synchronized based on the time of the communication node. On the contrary, when the GM priority of the communication node is lower than the GM priority indicated by the received synchronization frame, the communication node may be changed to a usual end node (e.g., switch, bridge, end node, etc.) from the grand master node. Accordingly, the 'gmPresent' parameter of the communication node may be changed from 'true' to 'false'.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. A first end node belonging to a first domain of a vehicle comprising a physical (PHY) layer including a PHY layer processor, a controller including a controller processor, and a memory storing at least one instruction executed by at least one of the PHY layer processor or the controller processor, wherein the at least one instruction is configured to:
   receive a first frame including time information from the vehicle;
   change the first end node to a new grand master node of the first domain when the time information indicates a time of a universal time domain; and
   synchronize a time of the new grand master node with the time of the universal time domain.

2. The first end node according to claim 1, wherein the first frame further includes information indicating a type of a domain operating based on the time of the universal time domain indicated by the time information.

3. The first end node according to claim 1, wherein communications between the first end node and the vehicle are performed based on wireless access in vehicular environment (WAVE).

4. The first end node according to claim 1, wherein the first end node is changed to the new grand master node of the first domain when a policy of the first domain allows change of a grand master node.

5. The first end node according to claim 1, wherein the first end node is changed to the new grand master node of the first domain when the first end node supports grand master node functions.

6. The first end node according to claim 1, wherein the first domain is a working clock domain.

7. The first end node according to claim 1, wherein the at least one instruction is further configured to measure a link delay time between the first end node and the vehicle,
   wherein the time of the new grand master node is configured to be a sum of the time of the universal time domain and the link delay time.

8. The first end node according to claim 1, wherein the at least one instruction is further configured to transmit a second frame including the time information to a previous grand master node of the first domain when the first end node is not changed to a new grand master node of the first domain.

9. The first end node according to claim 1, wherein the at least one instruction is further configured to transmit a third frame including time information indicating the time of the new grand master node to other communication nodes belonging to the first domain.

10. The first end node according to claim 9, wherein the third frame further includes priority information indicating a priority of the new grand master node.

11. A first end node belonging to a first domain of a vehicle comprising a physical (PHY) layer including a PHY layer processor, a controller including a controller processor, and a memory storing at least one instruction executed by at least one of the PHY layer processor or the controller processor, wherein the at least one instruction is configured to:
   receive, from a plurality of grand master nodes belonging to the first domain, a plurality of frames each of which includes a synchronization priority, an update time, position information of each of the plurality of grand master nodes, and time information;
   select a frame received from a grand master node among the plurality of grand master nodes based on the synchronization priority, the update time, and the position information included in the respective plurality of frames; and
   synchronize a time of the first end node with a time indicated by the time information included in the selected frame,
   wherein the selected frame is a frame having the highest synchronization priority among the plurality of frames.

12. The first end node according to claim 11, wherein each of the plurality of grand master nodes has a different priority.

13. The first end node according to claim 11, wherein the time information indicates a time of a universal time domain.

14. The first end node according to claim 11, wherein the first domain is a working clock domain.

15. A first grand master node belonging to a first domain of a vehicle comprising a physical (PHY) layer including a PHY layer processor, a controller including a controller processor, and a memory storing at least one instruction executed by at least one of the PHY layer processor or the controller processor, wherein the at least one instruction is configured to:
  receive, from a second grand master node belonging to the first domain, a frame including a second synchronization priority, a second update time, second position information of the second grand master node, and time information;
  compare a first synchronization priority of the first grand master node with the second synchronization priority; and
  change, the first grand master node to an end node when the first synchronization priority is lower than the second synchronization priority.

16. The first grand master node according to claim 15, wherein the at least one instruction is further configured to synchronize a time of the end node with a time indicated by the time information.

17. The first grand master node according to claim 16, wherein the time information indicates a time of a universal time domain.

18. The first grand master node according to claim 15, wherein the at least one instruction is further configured to:
  compare a first update time of the first grand master node with the second update time when the first synchronization priority and the second synchronization priority are same,
  change the first grand master node to the end node when the second update time is latest update time.

19. The first grand master node according to claim 18, wherein the at least one instruction is further configured to:
  when the first update time and the second update time are same,
  compare a first distance from the first grand master node to a universal time domain with a second distance from the second grand master node to the universal time domain based on first position information of the first grand master node and the second position information; and
  change the first grand master node to the end node when the first distance is far than the second distance.

* * * * *